(12) United States Patent
McGrath

(10) Patent No.: US 9,011,732 B2
(45) Date of Patent: Apr. 21, 2015

(54) CONDUCTIVE ADHESIVE

(76) Inventor: Paul McGrath, Mississauga (CA)

( * ) Notice: Subject to any disclaimer, the term of this patent is extended or adjusted under 35 U.S.C. 154(b) by 0 days.

(21) Appl. No.: 13/699,752

(22) PCT Filed: May 26, 2011

(86) PCT No.: PCT/CA2011/000599
§ 371 (c)(1),
(2), (4) Date: Feb. 11, 2013

(87) PCT Pub. No.: WO2011/147016
PCT Pub. Date: Dec. 1, 2011

(65) Prior Publication Data
US 2013/0193383 A1    Aug. 1, 2013

Related U.S. Application Data

(60) Provisional application No. 61/344,116, filed on May 26, 2010.

(51) Int. Cl.
| | |
|---|---|
| H01B 1/06 | (2006.01) |
| H01B 1/24 | (2006.01) |
| C09J 9/02 | (2006.01) |
| C09J 163/04 | (2006.01) |
| C09J 163/10 | (2006.01) |

(52) U.S. Cl.
CPC ...... *C09J 9/02* (2013.01); *C09J 163/04* (2013.01); *C09J 163/10* (2013.01)

(58) Field of Classification Search
CPC .......................................................... B03C 3/09
USPC ................................. 252/511; 210/243; 96/15
See application file for complete search history.

(56) References Cited

U.S. PATENT DOCUMENTS

| | | | |
|---|---|---|---|
| 3,765,154 | A | 10/1973 | Hardt et al. |
| 4,155,792 | A | 5/1979 | Gelhaar et al. |
| 4,247,307 | A | 1/1981 | Chang |
| 5,254,155 | A | 10/1993 | Mensi |
| 5,395,430 | A | 3/1995 | Lundgren et al. |
| 6,071,330 | A | 6/2000 | Matsubara et al. |
| 6,231,643 | B1 | 5/2001 | Pasic et al. |
| 6,508,861 | B1 | 1/2003 | Ray |
| 6,599,349 | B1 | 7/2003 | Scharkowski |
| 7,326,369 | B2 | 2/2008 | Cheng et al. |
| 7,585,434 | B2 | 9/2009 | Morita et al. |
| 8,597,416 | B2 | 12/2013 | Allan |
| 2004/0169162 | A1* | 9/2004 | Xiao et al. ................... 252/500 |
| 2006/0035081 | A1 | 2/2006 | Morita et al. |
| 2007/0051237 | A1 | 3/2007 | Furukawa et al. |
| 2007/0065703 | A1 | 3/2007 | Abd Elhamid et al. |
| 2009/0014378 | A1* | 1/2009 | Hundley et al. ............... 210/243 |

FOREIGN PATENT DOCUMENTS

| | | |
|---|---|---|
| EP | 1231248 A1 | 8/2002 |
| EP | 1701361 A1 | 9/2006 |
| WO | 98/21287 A1 | 5/1998 |
| WO | 2006/113749 | 10/2006 |
| WO | 2008/128353 | 10/2008 |
| WO | 2008/154735 | 12/2008 |

OTHER PUBLICATIONS

Guide to Fabricating FRP Composites with Corrosion-Resistant Vipel Resins, AOC (2008).*
International Preliminary Report on Patentability dated Dec. 6, 2012, for International Application No. PCT/CA2011/000599.
International Search Report dated Aug. 17, 2011, for International Application No. PCT/CA2011/000599.
International Preliminary Report on Patentability dated Dec. 22, 2009, for International Application No. PCT/CA2008/001157.
International Search Report dated Sep. 19, 2008, for International Application No. PCT/CA2008/001157.
Guide to Fabrication FRP Compositions with Corrosion-Resistant Vipel Resin, Vipel Corrosion Resistant Resins, AOC World Leader in Resin Technology, Copyright 2008: URL:http//www.estervinilica.com.br/datasheet/guia.
Narkis, M. et al., "Electrically Conductive Thermosetting Resins Containing Low Concentrations of Carbon Black", Jpurnal of Appliqed Polymer Science, 2000, vol. 76, Issue 7,pp. 1165-1170.
Chinese Office Action dated Sep. 23, 2009 for Chinese Patent Application No. 201180026189.6.
Chinese Office Action dated May 7, 2014 for Chinese Patent Application No. 201180026189.6.

* cited by examiner

*Primary Examiner* — Mark Kopec
*Assistant Examiner* — William Young

(57) ABSTRACT

A conductive adhesive is provided useful for providing electrically conductive joints in joins between panels, particularly conductive carbon composite panels in a WESP, is prepared from a corrosion resistant resin and particulate carbon black which is uniformly dispersed in the resin.

11 Claims, No Drawings

CONDUCTIVE ADHESIVE

REFERENCE TO RELATED APPLICATIONS

This application is a U.S. National Phase filing under 35 USC 371 of PCT/CA2011/000599 filed May 26, 2011 claiming priority under 35 USC 119(e) from U.S. Provisional Patent Application No. 61/344,116 filed May 26, 2010.

In copending PCT Patent Application No. PCT/CA2010/001404 filed Sep. 9, 2010 (WO 2011/029186), assigned to the assignee hereof and the disclosure of which is incorporated herein by reference, there is described the assembly of wet electrostatic precipitator tube bundles from conductive carbon composites.

FIELD OF INVENTION

The present invention relates to an electrically conductive adhesive which is useful in the assembly of wet electrostatic precipitator (WESP) tube bundles constructed from carbon composite materials.

BACKGROUND TO THE INVENTION

Briefly, conductive carbon composite material is molded into corrugated form, the corrugations of mating surfaces of adjacent panels are abraded to expose carbon fibres, adjacent corrugated strips are adhered at their abutting corrugations to form a hexagonal tube bundle, which is assembled with outer structural panels.

SUMMARY OF THE INVENTION

The present invention provides a conductive adhesive suitable for achieving adhesion between abutting corrugations of adjacent corrugated strips while also providing electrical conductivity between adhered abutting surfaces. The conductive adhesive of the present invention comprises a polyunsaturated resin which is corrosion resistant and heat distortion resistant and a carbon black filler. Preferably, the polyunsaturated resin is selected to have, when used, the same corrosion resistance and heat distortion resistance as the elements adhered by the resin.

Such polyunsaturated resin includes polyunsaturated vinyl ester resin, epoxy resin and urethane. The conductive adhesive of the invention is useful not only for achieving adhesion between abutting corrugation in the assembly of wet electrostatic precipitator tube bundles, but in other structures wherein an electrically-conductive bond is required between other types of joint, such as abutting, loop, splice and scarf joints. The invention includes the use of the adhesive for the assembly of WESPs from conductive carbon composites.

The conductive corrugated material from which the wet electrostatic precipitator bundle is formed is an electrically conductive hybrid composite material designed for highly corrosive operating conditions including dry and saturated mist environments with elevated temperatures. The hybrid composite material is corrosion and spark- and/or temperature-resistant. The hybrid composite material is a blend of carbon fibres and thermosetting resins developed for applications subjected to corona voltage flash over, spark, erosion, corrosion and power arc, including wet electrostatic precipitation. Such resins include thermosetting polyvinyl ester resins. Suitable materials are further described in WO 2008/154735 and WO 2010/108256, assigned to the assignee hereof and the disclosures of which are incorporated herein by references.

GENERAL DESCRIPTION OF THE INVENTION

The polyunsaturated resin of the present invention should be resistant to the corrosion and heat distortion conditions often encountered in a WESP. A number of commercial vinyl ester resins are available which are suitable for use herein, including the Vipel F085 series of epoxy novolac vinyl ester resins. These resins have a backbone chemistry which provides resistance to acids and bases and has superior resistance to many organic solvents. Vipel F085 series resins generally are resistant to liquids and vapors at higher temperatures than conventional bisphenol-A epoxy vinyl ester resins.

Other commercially-available polyunsaturated vinyl ester resins for use herein include Ashland Hetron 970, Ashland Durakane 470, Interplastic CoREZYN 8730 and Reichhold Dion 9480. In addition, polyunsaturated epoxy resin exhibiting corrosion resistance and heat distortion resistance may be employed, including Epon 828, Epon 815 and Epon 9504. Further, polyunsaturated urethane resin having corrosion resistance and heat distortion resistance may be employed, including Bayer Baypreg F, Bayer Blendur TP PU 90IK28.

The carbon black filler component of the conductive adhesive, usually added in the form of a paste, is one which permits a high loading of carbon black into the composition with the polyunsaturated vinyl ester resin. One such commercially-available product is Plasticolors HC-21109. Alternative commercially-available carbon black products include Degussa/Evonik Printex XE2, and Timcal Ensaco 350G. In general, the quantity of carbon black filler employed in the composition is about 10 to about 30 wt %.

To form the adhesive composition of the present invention, the carbon black filler is mixed with the polyunsaturated vinyl ester resin along with other additives other than the cross-linking agent, under high shear to fully and uniformly disperse the carbon black filler and other ingredients in the resin base to provide a homogenous mixture.

In addition to the base resin and the carbon black paste, the conductive adhesive of the present invention may include a number of additives which are useful in the curing of the polyunsaturated vinyl ester resin. Such materials include the main cross-linking agent, such as cumyl hydroperoxide, and polymerization accelerators, such as cobalt naphthalate and dimethylmethacrylate.

A further process additive which may be present includes a solution of paraffin wax and styrene, which serves to prevent air occlusion during curing of the adhesive corrugation.

The homogenous mixture of polyunsaturated vinyl ester resin and carbon black can be stored for future use without separation of components thereof. At the time of application of the adhesive composition for achieving adhesion between surfaces, the cross-linking agent, such as cumyl hydroperoxide, is added and dispersed therein and the formulation applied to the surfaces to be adhered together by any convenient means, such as manually, such as by roller, brush or squeegee, and the polyunsaturated vinyl ester resin cured with the surfaces to be adhered together abutting other. Such time-dependent catalysis system may be replaced by a temperature activated catalysis.

EXAMPLE

This Example illustrates an adhesive composition provided in accordance with the invention.

A formulation was prepared from the following components:

100 phr AOC Vipel-F085-ASA-DO
15 phr Plasticolors HC-21109

0.4 phr cobalt naphthalate
0.2 phr DMA

To the Vipel-F085 resin was added, in order, the cobalt naphthalate, DMA and Plasticolors HC-21109, and the composition mixed for 20 minutes using a polybladed impeller. During the mixing, the impeller was continuously raised and lowered to prevent overheating of pockets of material. The temperature of the composition was maintained below 30° C. during the mixing operation.

When this composition was used, 2.0 phr of NOVOX CHP (cumyl hydroperoxide) was added.

SUMMARY OF THE DISCLOSURE

In summary of this disclosure, the present invention provides an electrically conductive adhesive useful for adhering elements of wet electrostatic precipitator tube bundles formed from conductive carbon composites. Modifications are possible within the scope of this invention

What we claim is:

1. A wet electrostatic precipitator (WESP) conductive carbon composite panel comprising corrugated strips of conductive carbon composite adhesively bonded together using an electrically-conductive adhesive composition, the composition comprising a polyunsaturated resin which, following polymerization, exhibits resistance to corrosion and heat distortion, and a carbon black filler uniformly dispersed in the resin.

2. The panel of claim 1 wherein the polyunsaturated resin is a polyunsaturated vinyl ester resin.

3. The panel of claim 2 wherein said polyunsaturated vinyl ester resin is an epoxy novolac vinyl ester resin.

4. The panel of claim 1 wherein said carbon black filler is present in an amount of about 10 to about 30 wt %.

5. The panel of claim 1 wherein the composition further comprises at least one cross-linking agent for said polyunsaturated resin.

6. The panel of claim 5 wherein the cross-linking agent is cumyl hydroperoxide.

7. The panel of claim 1 wherein the composition further comprises at least one curing accelerator.

8. The panel of claim 7 wherein said curing accelerator is cobalt naphthalate.

9. The panel of claim 1 wherein the composition further comprises a solution of paraffin wax and styrene.

10. The panel of claim 1 wherein the electrically conductive adhesive composition is formed by a method comprising:
    mixing a paste of finely divided carbon black filler with a polyunsaturated resin which, following polymerization, exhibits resistance to corrosion and heat distortion, along with other optional additives other than a cross-linking agent for said resin under high shear to fully disperse the carbon black filler and optional additives in the resin to form a homogenous mixture.

11. A WESP comprising the panel according to claim 1.

* * * * *